(12) United States Patent
Avery

(10) Patent No.: US 9,577,891 B1
(45) Date of Patent: Feb. 21, 2017

(54) METHOD AND SYSTEM FOR DEFINING AND CONSOLIDATING POLICIES BASED ON COMPLEX GROUP MEMBERSHIP

(71) Applicant: Devin Blinn Avery, Portsmouth, NH (US)

(72) Inventor: Devin Blinn Avery, Portsmouth, NH (US)

(73) Assignee: CA, Inc., New York, NY (US)

( * ) Notice: Subject to any disclaimer, the term of this patent is extended or adjusted under 35 U.S.C. 154(b) by 553 days.

(21) Appl. No.: 13/839,465

(22) Filed: Mar. 15, 2013

(51) Int. Cl.
*G06F 15/16* (2006.01)
*H04L 12/24* (2006.01)

(52) U.S. Cl.
CPC .................... *H04L 41/50* (2013.01)

(58) Field of Classification Search
CPC ........................................ H04L 41/50
See application file for complete search history.

(56) References Cited

U.S. PATENT DOCUMENTS

| | | | |
|---|---|---|---|
| 6,141,686 A * | 10/2000 | Jackowski et al. | 709/224 |
| 6,735,701 B1 * | 5/2004 | Jacobson | 726/1 |
| 7,376,694 B2 | 5/2008 | Taylor et al. | |
| 7,401,133 B2 * | 7/2008 | Huang et al. | 709/220 |
| 7,409,447 B1 * | 8/2008 | Assadzadeh | 709/225 |
| 7,421,485 B2 | 9/2008 | Shafer | |
| 8,156,213 B1 | 4/2012 | Deng et al. | |
| 8,589,200 B2 * | 11/2013 | Ruparelia | G06Q 10/00 705/7.11 |
| 2002/0129135 A1 * | 9/2002 | Delany et al. | 709/223 |
| 2002/0194323 A1 * | 12/2002 | Chantrain et al. | 709/223 |
| 2003/0093672 A1 * | 5/2003 | Cichowlas | 713/168 |
| 2004/0161086 A1 * | 8/2004 | Buntin et al. | 379/189 |
| 2004/0230681 A1 * | 11/2004 | Strassner et al. | 709/226 |
| 2006/0092861 A1 * | 5/2006 | Corday et al. | 370/256 |
| 2007/0088630 A1 * | 4/2007 | MacLeod et al. | 705/28 |
| 2007/0206515 A1 * | 9/2007 | Andreasen et al. | 370/255 |
| 2008/0201159 A1 * | 8/2008 | Gabrick et al. | 705/1 |
| 2008/0201454 A1 * | 8/2008 | Soffer | 709/220 |
| 2010/0037088 A1 * | 2/2010 | Krivopaltsev et al. | 714/4 |
| 2013/0325997 A1 * | 12/2013 | Higgins et al. | 709/208 |
| 2014/0115138 A1 * | 4/2014 | Biles et al. | 709/223 |
| 2015/0127803 A1 * | 5/2015 | Hu | H04L 47/782 709/223 |

* cited by examiner

*Primary Examiner* — Moustafa M Meky
*Assistant Examiner* — Andrea Hurst
(74) *Attorney, Agent, or Firm* — Baker Botts L.L.P.

(57) ABSTRACT

A method includes selecting an item. The method further includes determining a plurality of groups. The item is associated with each of the plurality of groups. The method includes determining a plurality of group policies for a policy type. Each of the plurality of group policies corresponds to one of the plurality of groups and comprises a setting. The method includes ranking the plurality of group policies based on a first predetermined priority. The method further includes generating a consolidated item policy. The consolidated item policy includes the settings in the plurality of group policies prioritized based on the ranking of the plurality of group policies. The method further includes assigning the consolidated item policy to the item.

21 Claims, 7 Drawing Sheets

METHOD AND SYSTEM FOR DEFINING AND CONSOLIDATING POLICIES BASED ON COMPLEX GROUP MEMBERSHIP

BACKGROUND

The present disclosure relates to infrastructure and operations management and, more specifically, to a method and system for defining and consolidating policies based on complex group membership.

Existing infrastructure and operations management systems manage global lists, which define default policies that apply to all items within a network or system. Such default policies correspond to settings that generally apply to all of the items in the system. If a user wants to make an exception for an individual item or a type of item in the system, the user may manually specify an override to the settings for that individual item or type of item. However, as the number of items that are monitored increases and the diversity of these monitored items grow, the user may find it increasingly difficult to guarantee default policies that would apply to all or a majority of the items. Thus, in some sophisticated systems, the user may define policies based on a type of item or a group of items. But if an item belongs to more than one group, these sophisticated systems may fail to assign an appropriate policy to such an item.

BRIEF SUMMARY

According to an aspect of the present disclosure, a method may comprise selecting an item. The method may further comprise determining a plurality of groups, in which the item is associated with each of the plurality of groups. The method may also comprise determining a plurality of group policies for a policy type. Each of the plurality of group policies may correspond to one of the plurality of groups and comprise a setting. The method may comprise ranking the plurality of group policies based on a first predetermined priority. The method may further comprise generating a consolidated item policy. The consolidated item policy may comprise the settings in the plurality of group policies prioritized based on the ranking of the plurality of group policies. The method may further comprise assigning the consolidated item policy to the item.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
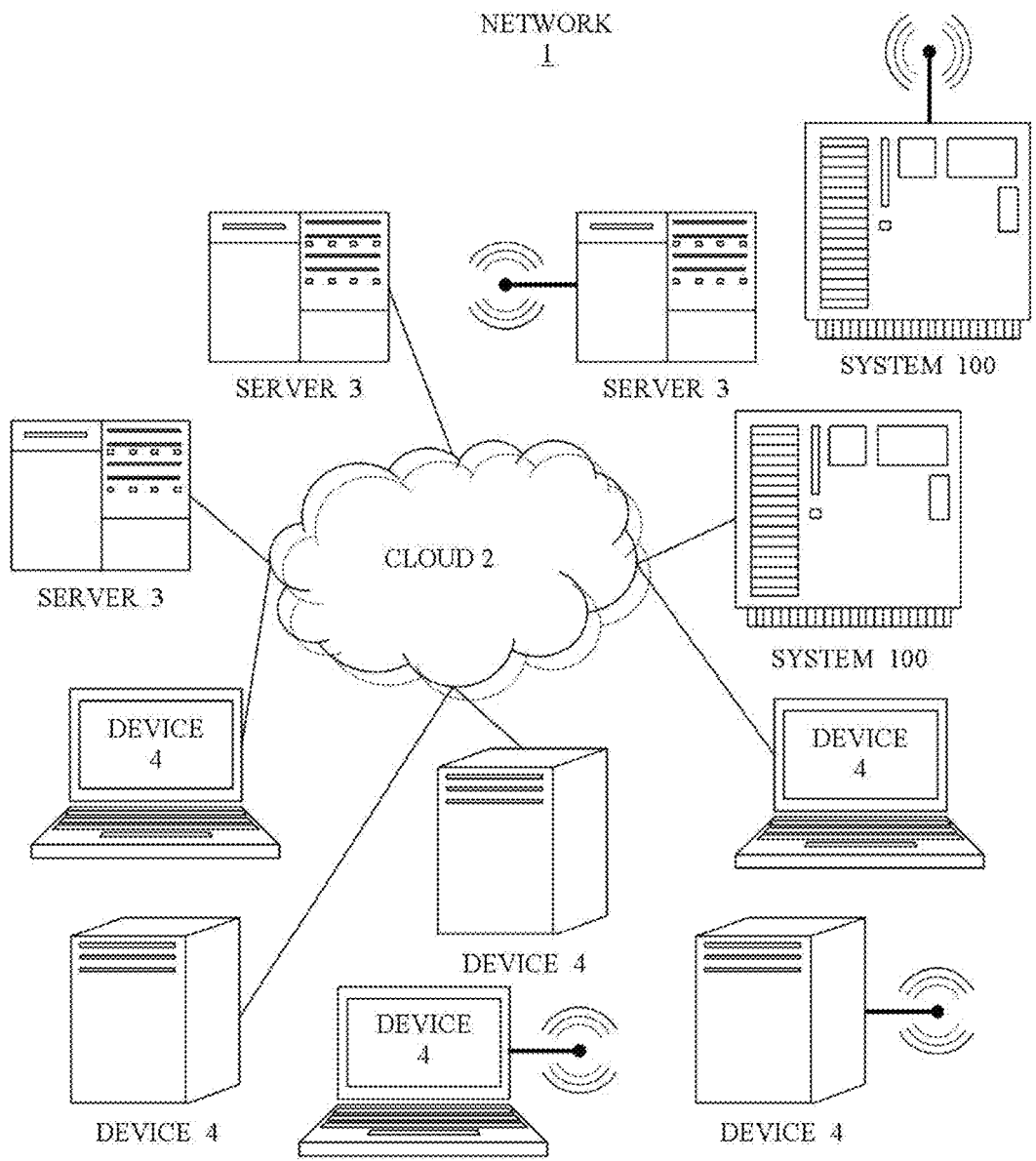
FIG. 1 is a schematic representation of a network monitored by a device that assigns policies to items based on complex group membership.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure and operations management, systems and methods disclosed herein may also be related to data modeling and analysis. Referring now to infrastructure and operations management, existing systems may specify policies for items by assigning a default policy to all of the items. Such policies may comprise one or more settings. The systems may have a global list that defines the default policy that is assigned to the items. The systems may require a user to manually specify an override to an individual item or for a type of item when the user wants to make an exception for the individual item or the type of item. Consequently, such systems may not scale easily.

For example, an existing system may specify a naming policy for network device items. The naming policy may state that a first network device item can either use an internet protocol (IP) address or a domain name system (DNS) name as the first network device item's name. Ideally, in such a system, a single naming policy may be in effect and the naming rule that applied to the first network device item would be the same for all the network device items. However, as a number and types of network device items increase, the likelihood that the single naming policy will satisfy the majority of the network device items may decrease. For example, a user may want to specify a different naming policy for other network device items that states that those network device items should either use a system name or a DNS name.

In some existing systems, a user may define a policy based on a type of item. For example, an item of type X may be assigned a first policy and an item of type Y may be assigned a second policy. By defining policies based on the type of item, the user may encounter fewer exceptions and, consequently, may not have to specify as many overrides. For example, instead of requiring the user to specify an override for each item that is associated with a type of item, the system may only require the user to specify a single override for all items that are associated with that type of item. However, such systems may encounter a problem when a single item is logically or physically associated with more than one type of item. For example, an existing system that has a first naming policy for switches and a second naming policy for routers may encounter a problem with a device that is both a switch and a router. One solution to solving the problem in existing systems may require the user to define a new policy for each item that is associated with a different combination of types of items or, phrased more generally, to define a new policy for each item that is associated with a different group, wherein the group defines a specific combination of types of items or a class of items. Another solution to solving the problem may involve having the system randomly assign a policy based on one of the types of items that is associated with the item. When applying such solutions, the user may also have to consider how to define and maintain a policy for items that are associated with more than one group when the policy comprises more than one setting or, in particular, a list or ordering of settings.

Accordingly, existing systems for defining policies for items may not account for items that are associated with more than one group of items. In addition, even if existing systems have a solution for dealing with items that are associated with more than one group of items, the solution may be cumbersome, may be costly in both time and resources, and may not allow for simple autonomous implementation.

Systems and methods disclosed herein may specify policies for groups of items that allow items to be associated with more than one group. Particular systems may define a clear prioritization between the groups, which allows a user to clearly identify which settings corresponding to one or more associated policies will be specified first, second, and so on. For example, in a system, a user may define a first naming policy for a group of items corresponding to items that are routers which specifies that DNS names should be used as a setting for the first naming policy. The user may similarly define a second naming policy for a group of items corresponding to items that are switches which specifies that IP addresses should be used as a setting for the second naming policy. The user may then define a prioritization between the two groups that specifies that if an item is associated with both groups, then the setting used for the first naming policy (i.e., the item's DNS name) should take priority over the setting used for the second naming policy (i.e., the item's IP address). In such systems, the user may consolidate the settings for an item with minimal management. Further, such systems may allow the user to set group policies but still have control and flexibility to define which settings in the group policies will be specified for the items that are associated with more than one group.

In certain systems and methods disclosed herein, policies for groups of items may comprise an ordering of settings. For example, returning to naming policies, in a system, a first naming policy corresponding to routers may comprise a first setting, DNS name, followed by a second setting, system name. Similarly, a second naming policy corresponding to switches may comprise a third setting, DNS name, and a fourth setting, IP address. In such system, if an item is both a router and a switch (i.e., is associated with both groups), then a consolidated policy that is generated and applied to the item may be DNS name, followed by system name, followed by IP address.

In systems and methods disclosed herein, one advantage to a user may be that the user can engage in linear management of policies while still being able to define and control item policies for items that are associated with any possible combination of groups of items. Another advantage to the user may be that there will be a single consolidated item policy that is assigned to each item which can be monitored for changes. And another advantage to the user may be that the systems and methods disclosed herein will make specifically clear which consolidated policy will be assigned to each item based on the groups that are associated with the item or the item's complex group membership.

Referring now to FIG. 1, a network 1 monitored by a device that assigns policies to items based on complex group membership is described. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information and provisioning of services among users that are connected to cloud 2.

Network 1 may comprise one or more servers 3 and other devices operated by service providers, information providers, and other parties. Network 1 also may comprise one or more devices 4 utilized by service consumers, information consumers, and other parties. Service providers and information providers may provide information and services to information consumers and service consumers utilizing the one or more servers 3, which connect to the one or more devices 4 via cloud 2. The services may comprise, for example, information technology services, monitoring services, operations services, infrastructure services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers. Exemplary items may include network 1, cloud 2, servers 3, and devices 4.

Moreover, network 1 may comprise one or more system 100 that may collect information from and about network 1, cloud 2, servers 3, devices 4, and other devices connected to cloud 2. System 100 may be, for example, one or more of a general purpose computing device, a specialized computing device, a wired device, a wireless device, a mainframe device, an infrastructure device, a monitoring device, and any other device configured collect data from one or more data sources (e.g., servers, sensors, networks, interfaces, other devices). System 100 may connect to cloud 2 and monitor network 1, cloud 2, servers 3, devices 4, and other devices connected to cloud 2 for available information (e.g., physical properties, logical properties, user-defined properties, and other classifying properties) about items including network 1, cloud 2, servers 3, devices 4, and other items connected to cloud 2 and existing in network 1, cloud 2, servers 3, devices 4, and other items connected to cloud 2. System 100 may generate consolidated item policies for each item, wherein the consolidated item policy comprises one or more settings or values corresponding to a policy type (described below). System 100 may utilize these consolidated item policies to provide users with pertinent information about network 1, cloud 2, servers 3, devices 4, other items connected to cloud 2, and other systems, events, services, and processes monitored by such items. In this manner, system 100 may identify changes associated with network 1, cloud 2, servers 3, devices 4, other items connected to cloud 2, and other systems, events, services, and processes monitored by such items in response to changes in the consolidated item policies.

In some configurations, one or more of servers 3 and devices 4 may comprise system 100. In other configurations, system 100 may be separate from servers 3 and devices 4.

Figure 2:
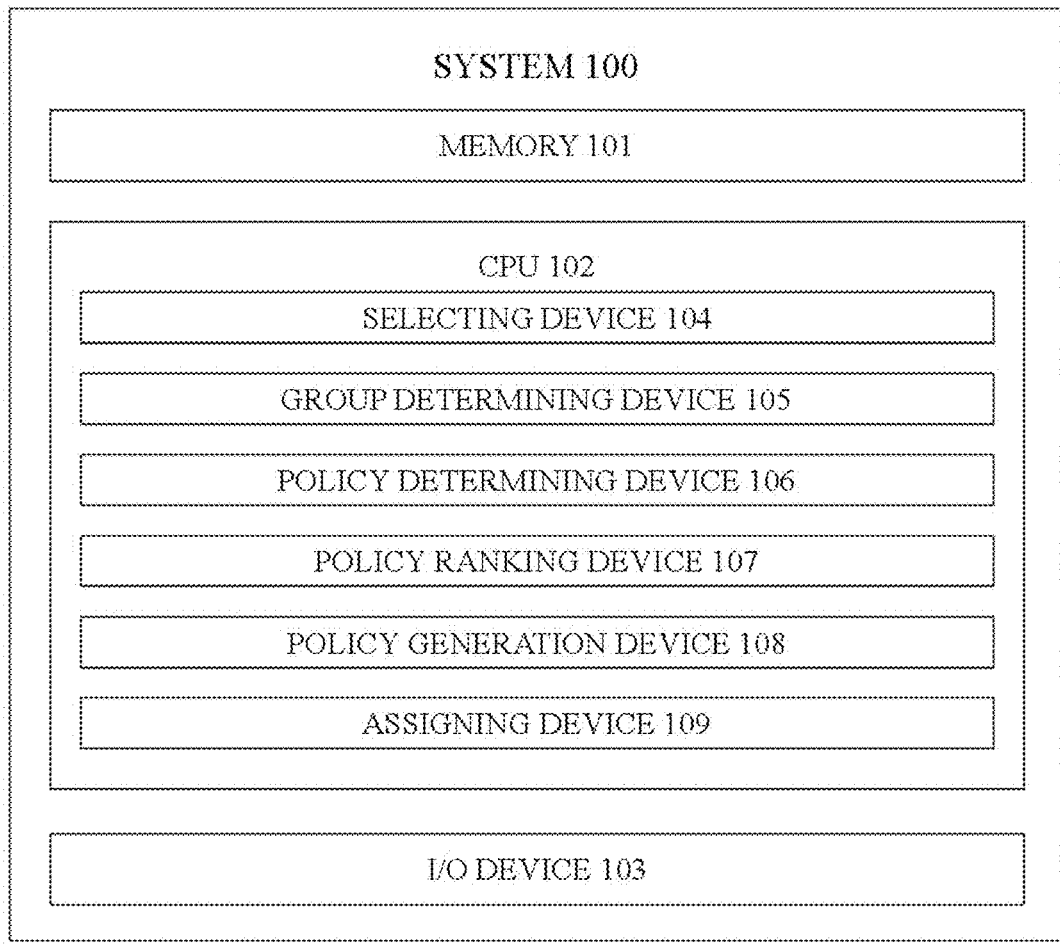
FIG. 2 is a schematic representation of a system configured to assign policies to items based on complex group membership.

Referring now to FIG. 2, system 100, which may assign policies to items based on complex group membership, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a selecting device 104, a group determining device 105, a policy determining device 106, a policy ranking device 107, a policy generation device 108, and an assigning device 109. In particular configurations, one or more of selecting device 104, group determining device 105, policy determining device 106, policy ranking device 107, policy generation device 108, and assigning device 109 may be implemented on one or more different CPUs, which may be comprised in remote or local devices.

I/O device 103 may receive one or more of data from cloud 2, data from other devices and sensors connected to system 100, and input from a user and provide such information to CPU 102. I/O device 103 may transmit data to cloud 2, may transmit data to other devices connected to system 100, and may transmit a notification to a user (e.g., display a message, make a sound, send an email, make a telephone call). Further, I/O device 103 may implement one or more of wireless and wired communication between system 100 and other devices.

Figure 3:
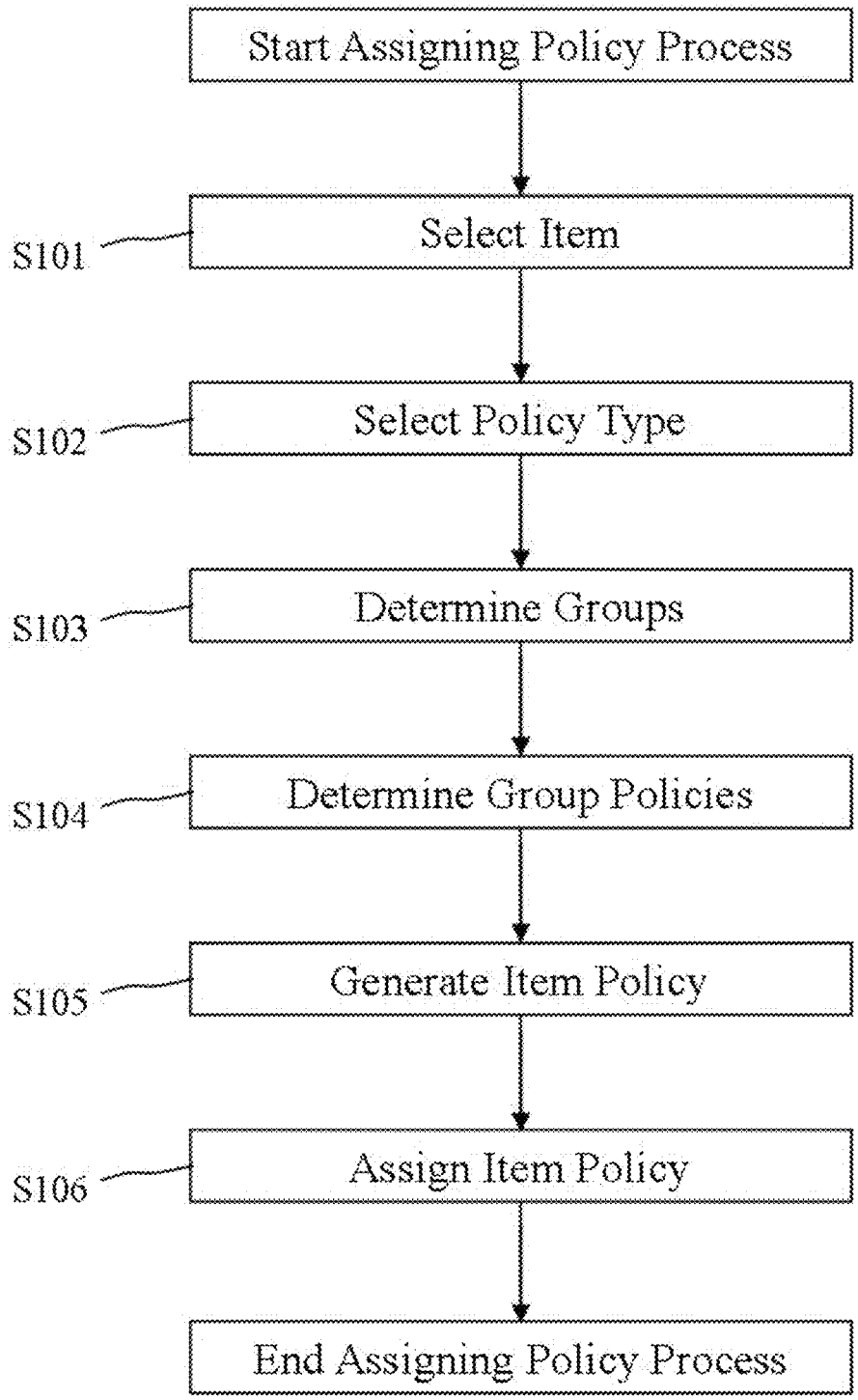
FIG. 3 illustrates a process of assigning a consolidated item policy to an item.
Figure 4:
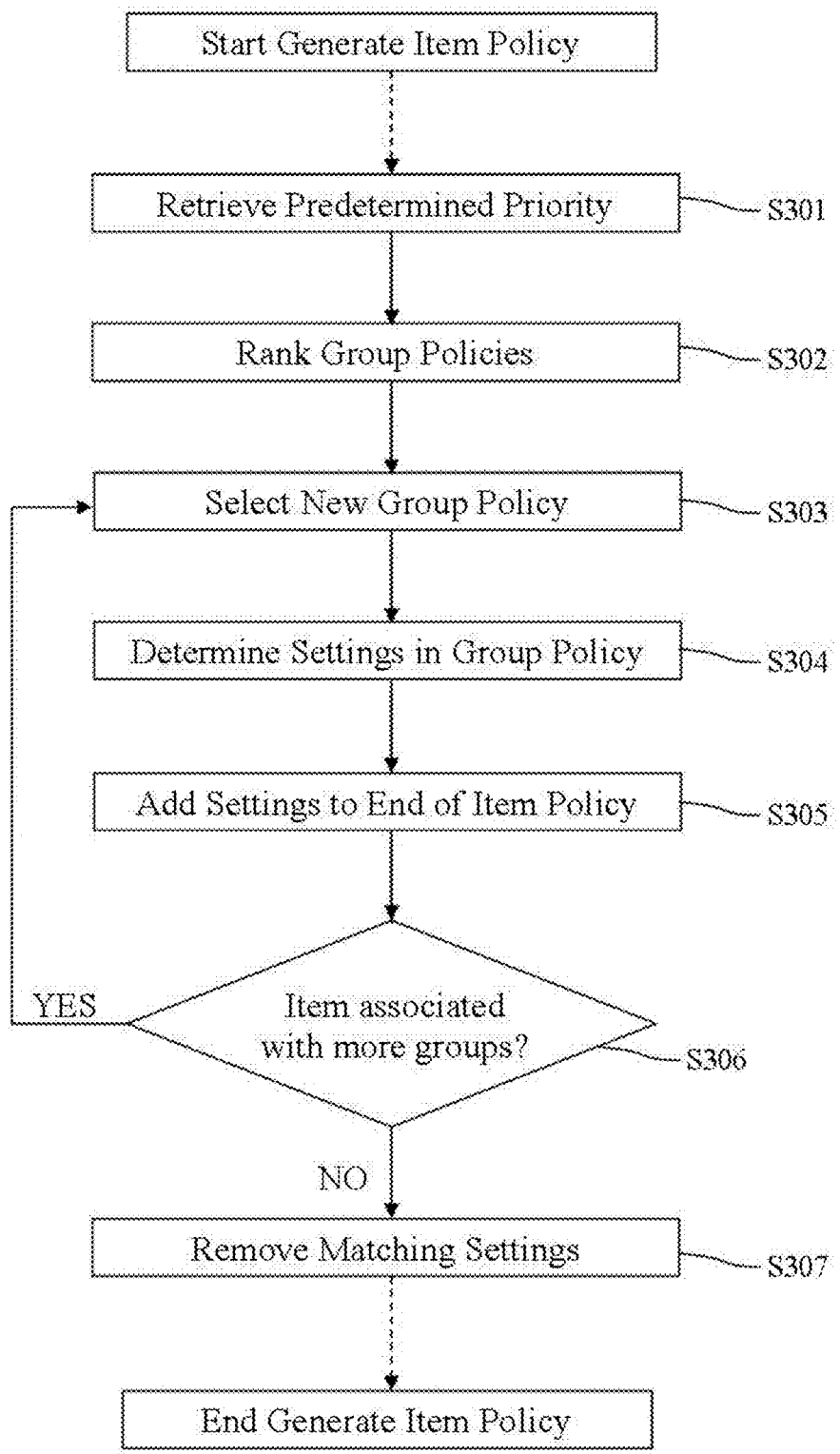
FIG. 4 illustrates a process of generating a consolidated item policy.

Referring now to FIGS. 3 and 4, exemplary processes performed by selecting device 104, group determining device 105, policy determining device 106, policy ranking device 107, policy generation device 108, and assigning device 109 now are described. FIG. 3 depicts a process for assigning a consolidated item policy to an item. In S101, selecting device 104 may select an item. For IT systems, items may comprise, for example, computer components (e.g., processors, motherboards, memory, hard drives, video cards), logical computer components (e.g., software, applications), physical network entities (e.g., nodes, links), or logical network entities (e.g., process, service). For other activities, items may comprise financial items (e.g., sales, expense accounts) and management items (e.g., approvals). In S102, selecting device 104 may select a policy type. Policy types may comprise, for example, a naming policy, a normalization policy, a collection rate policy, a display policy, a scheduling policy, an audit policy. In S103, group determining device 105 may determine a plurality of groups with which the item is associated. A group, as described above, may define a specific combination of types of items or a class of items. For example, a group may correspond to items that are routers, items that are switches, or items that are both routers and switches. In certain configurations, a first group may define a first class of items that encompasses items that are also associated with a second group that defines a second class of items. In such configurations, the first group and the second group may define classes of items that overlap in scope. In other configurations, each group may define a class of items that is distinct and separate from classes of items that are defined by other groups.

Determining a plurality of groups with which the item is associated may comprise identifying information (e.g., physical properties, logical properties, user-defined properties, and other classifying properties) about the item, selecting a first group, determining whether the first group comprises items with the identified information, associating the first group with the item if the first group comprises items with the identified information, and repeating the process with a next group until a list of groups is exhausted. The list of groups may comprise all of the groups in a system or a subset of groups in the system. After the plurality of groups is determined, in S104, policy determining device 106 may determine group policies for the policy type, in which each group policy corresponds to one of the plurality of groups.

In certain configurations, each group policy may comprise a setting or value. A setting may comprise settings for a naming policy (e.g., IP address, system name, application name, server name, DNS name, operating system name), settings for a normalization policy (e.g., sources of information, types of information), settings for a collection rate policy (e.g., collection rates), settings for a display policy (e.g., order of reports or graphs, method of displaying reports or graphs), settings for a scheduling policy (e.g., hours of a day, days, other scheduled times), settings for an auditing policy (e.g., auditing processes), settings for a network management policy (e.g., a data retention rate, a number of allowed connected users, a computer networking port), and other settings. For example, a group policy for a naming policy may comprise a setting, DNS name, which, if assigned to an item, would indicate that the item should be named based on the item's DNS name. As another example, a group policy for a normalization policy may comprise a setting, trusted source, which, if assigned to an item, would indicate that the item should normalize new sets of data based on information from the trusted source. As yet another example, a group policy for a scheduling policy may comprise a setting, 1:00 a.m., which, if assigned to an item, would indicate that the item should perform a particular action at 1:00 a.m. As another example, a group policy for an auditing policy may comprise a setting, strict audit process, which, if assigned to an item, would indicate that the item should be audited based on the strict audit process.

In S105, policy generation device 108 may generate a consolidated item policy. The consolidated item policy may comprise the settings in the group policies organized or prioritized based on a ranking of the group policies. The ranking of the group policies may be based on a first predetermined priority. Such first predetermined priority may correspond to a predetermined priority of the groups or some other predetermined priority. In S106, assigning device 109 may assign the consolidated item policy to the selected item.

In other configurations, each group policy may comprise a plurality of settings prioritized based on a second predetermined priority. For example, a first group policy may comprise three settings—Value 1, Value 2, and Value 3—where Value 3 is first in priority, Value 2 is second in priority, and Value 1 is third in priority; and a second group may comprise two settings—Value 4 and Value 5—where Value 4 is first in priority and Value 5 is second in priority. In S105, policy generation device 108 may generate a consolidated item policy, which comprises the settings in the group policies. The settings may be prioritized first based on the second predetermined priority corresponding to each group policy and second based on a ranking of the group policies. As described above, the ranking of the group policies may be based on a first predetermined priority, and such first predetermined priority may correspond to a predetermined priority of the groups or some other predetermined priority. For example, continuing from the above example, policy determining device 106 may identify the first and second group policies. Policy generation device 108 may generate a consolidated item policy that comprises the settings in the two group policies. In the example, the ranking of the group policies may comprise the first group policy being ranked first and the second group policy being ranked second, and the second predetermined priority for each group policy may be defined as above. Thus, the consolidated item policy may be Value 3, Value 2, Value 1, Value 4, and Value 5, in that respective order. Lastly, in S106, assigning device 109 may assign the consolidated item policy to the selected item.

In certain configurations, S101 and S102 may be performed at the same time or performed in a different order. In other configurations, S102 may be performed after S103. In particular configurations, S101-S106 may be performed for more than one item at the same time. In still other configurations, S101-S106 may be performed for more than one policy type at the same time.

Referring now to FIG. 4, which provides a detailed view of S105, policy generation device 108, with assistance from policy ranking device 107, may generate a consolidated item policy that comprises settings from group policies. In S301, policy ranking device 107 may retrieve a first predetermined priority. As described above, the first predetermined priority may correspond to a predetermined priority of the groups or some other predetermined priority. In S302, policy ranking device 107 may rank the group policies based on the first predetermined priority. In S303, after policy ranking device 107 ranks the group policies, policy generation device 108 may select a first group policy, wherein the first group policy corresponds to a group policy with a highest rank. As described above, each group policy may comprise a setting or a plurality of settings organized based on a second predetermined priority. In S304, policy generation device 108 may determine the setting or the plurality of settings in the first group policy. In S305, policy generation device 108 may begin creating the consolidated item policy by adding the determined settings to the consolidated item policy.

After the determined settings are added to the consolidated item policy, policy generation device 108 may determine whether the selected item is associated with more groups. If policy generation device 108 determines that there are other associated groups (S306: YES), then the process may proceed back to S303 and policy generation device 108 may select a next group policy, determine settings for the new group policy, and add the newly determined settings to the end of the consolidated item policy. The next group policy would correspond to a group policy with a next highest rank. Once policy generation device 108 determines that the selected item is not associated with more groups (S306: NO), then the process may proceed to S307.

In particular configurations, S303-S305 may be performed for more than one group policy at the same time, and S306 may be omitted. For example, in such configurations, policy generation device 108 may generate a consolidated item policy by determining settings for a plurality of group policies and organizing the settings based on a ranking of the plurality of group policies.

In S307, policy generation device 108 may remove matching settings from the consolidated item policy. Prior to removing the matching settings, the consolidated item policy may comprise the settings in the group policies prioritized based on the ranking of the group policies or the pluralities of settings in the group policies prioritized first based on the second predetermined priority and second based on the ranking of the group policies. The matching settings may comprise one or more settings that match another setting in the consolidated group policy (described below).

Figure 5:
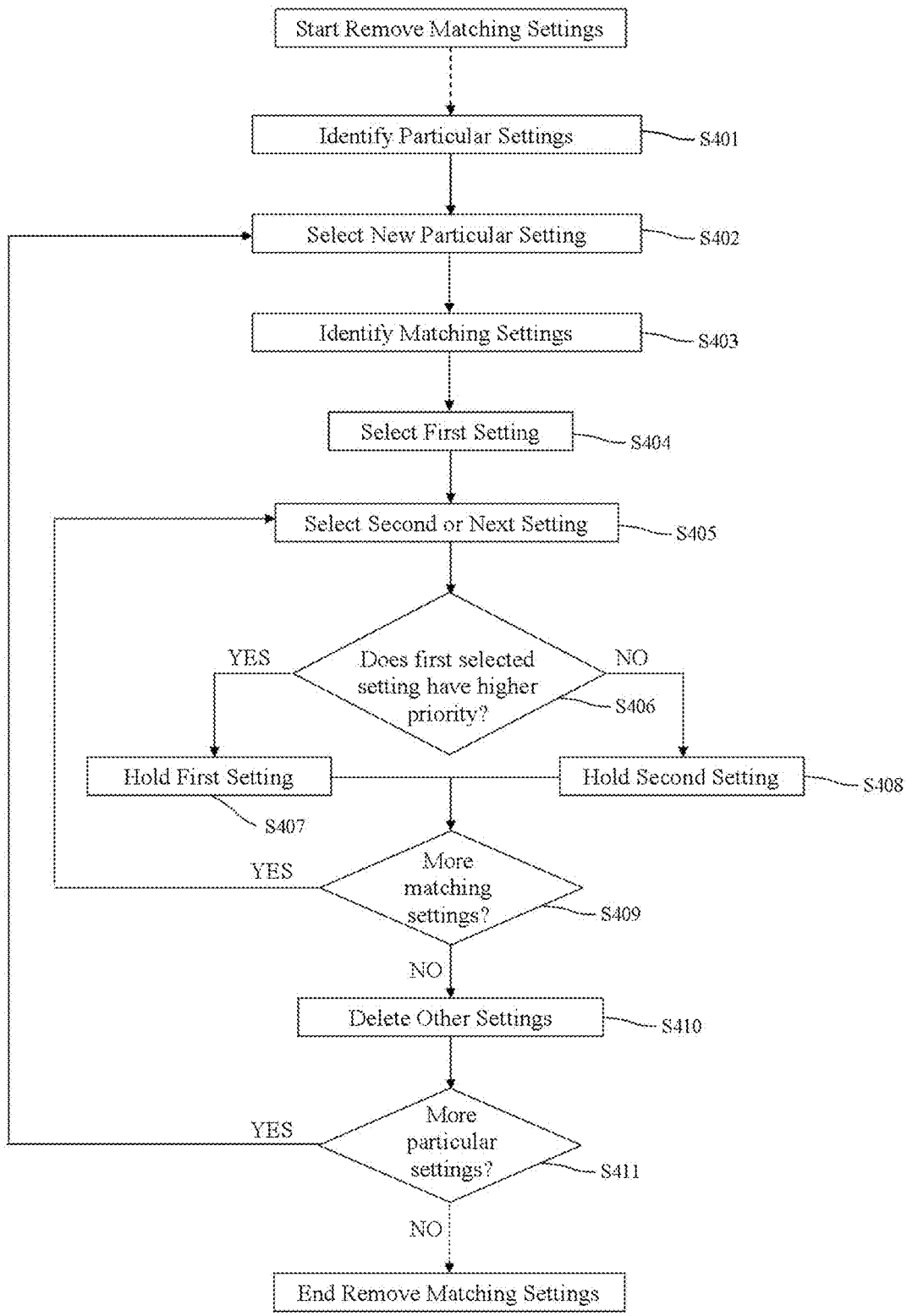
FIG. 5 illustrates a process of removing matching settings from a consolidated item policy.

Referring to FIG. 5, which provides a view of S307, policy generation device 108 may remove matching settings by identifying particular settings, identifying the matching settings, and removing all of the identified settings except for a setting that has the highest priority. In S401, policy generation device 108 may identify the particular settings. The particular settings may comprise settings with distinct values. In S402, policy generation device 108 may select a first particular setting. In S403, policy generation device 108 may identify in the consolidated item policy one or more additional settings other than the first particular setting that matches the first particular setting. In S404 and S405, policy generation device 108 may select a first setting and a second setting from the group comprising the first particular setting and the one or more additional settings. The group comprising the first particular setting and the one or more additional settings may be known as "matching settings." After selecting the first and second settings, policy generation device 108 may determine which setting has a higher priority. If policy generation device 108 determines that the first setting has a higher priority (S406: YES), then policy generation device 108 may proceed to S407 and hold onto the first setting. If policy generation device 108 determines that the second setting has a higher priority (S406: NO), then policy generation device 108 may proceed to S408 and hold onto the second setting. In S409, policy generation device 108 may determine whether there are more matching settings. If there are more matching settings (S409: YES), then policy generation device 108 may proceed back to S405 and select a next setting. Policy generation device 108 may then repeat S405-S408. If there are no more matching settings (S409: NO), then policy generation device 108 may proceed to S410 and delete or remove from the consolidated item policy the matching settings that are not the setting that has a highest priority or the setting that is being held. In S411, policy generation device 108 may determine whether there are more identified particular settings. If there are more identified particular settings (S411: YES), then policy generation device 108 may proceed back to S402 and select a next particular setting. Policy generation device 108 may then repeat S402-S410 for the next particular setting. Once policy generation device 108 determines that there are no more particular settings (S411: NO), then policy generation device 108 may terminate the process.

In certain configurations, S307 may be omitted. In other configurations, S307 may be performed at the same time as S303-S306. For example, policy generation device 108 may remove matching settings from the consolidated item policy as newly determined settings are added to the consolidated item policy. In particular configurations, S402-S411 may be performed for more than one particular setting at the same time. In other configurations, S405-S410 may be omitted because the consolidated item policy may not have additional settings that match an identified particular setting. In still other configurations, a particular setting may comprise a setting with a distinct value that has a highest priority, and S404-S409 may be omitted. For example, in a system, policy generation device 108 may identify particular settings in a consolidated item policy by starting at a beginning of the consolidated item policy corresponding to a setting with a highest priority, identifying earliest settings with particular values in the consolidated item policy, and ending with a end of the consolidated item policy corresponding to a setting with a lowest priority. In such system, the particular settings that are identified may already comprise settings with particular values that have highest priorities. Consequently, S404-S409 may be omitted in such systems.

Figure 6A:
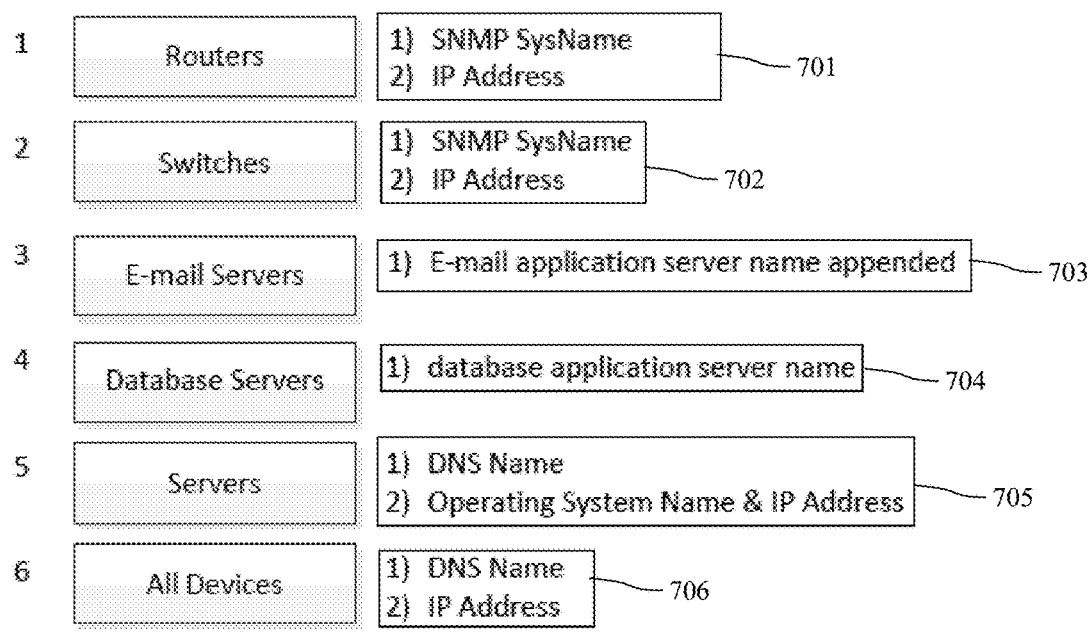
FIG. 6A depicts an example of groups with group policies for a policy type.

FIG. 6A depicts an example of groups with group policies for a policy type. In FIG. 6A, there are six groups, Groups 1-6, that each defines a class of items. Groups 1-6 may define classes of items that overlap in scope. Specifically, Group 1 defines a first class of items, routers; Group 2 defines a second class of items, switches; Group 3 defines a third class of items, e-mail servers; Group 4 defines a fourth class of items, database servers; Group 5 defines a fifth class of items, servers; and Group 6 defines a sixth class of items, all devices. Each group has a group policy for a policy type, a naming policy. Group 1 has a first group policy 701; Group 2 has a second group policy 702; Group 3 has a third group policy 703; Group 4 has a fourth group policy 704; Group 5 has a fifth group policy 705; and Group 6 has a sixth group policy 706. Each group policy may comprise a setting or a plurality of settings prioritized based on a predetermined priority. Specifically, group policies 703 and 704 each comprise a setting, and group policies 701, 702, 705, and 706 each comprise a plurality of settings prioritized based on a predetermined priority. Group policy 701 comprises two settings, "SNMP SysName" that has a first priority and "IP Address" that has a second priority. Similarly, group policy 702 comprises two settings, "SNMP SysName" that has a first priority and "IP Address" that has a second priority. Group policy 703 comprises a single setting, "E-mail application server name appended," and group policy 704 comprises a single setting, "database application server name." Group policy 705 again comprises two settings, "DNS Name" with a first priority and "Operating System Name & IP Address" with a second priority. And group policy 706 comprises two settings, "DNA Name" with a first priority and "IP Address" with a second priority.

Figure 6B:
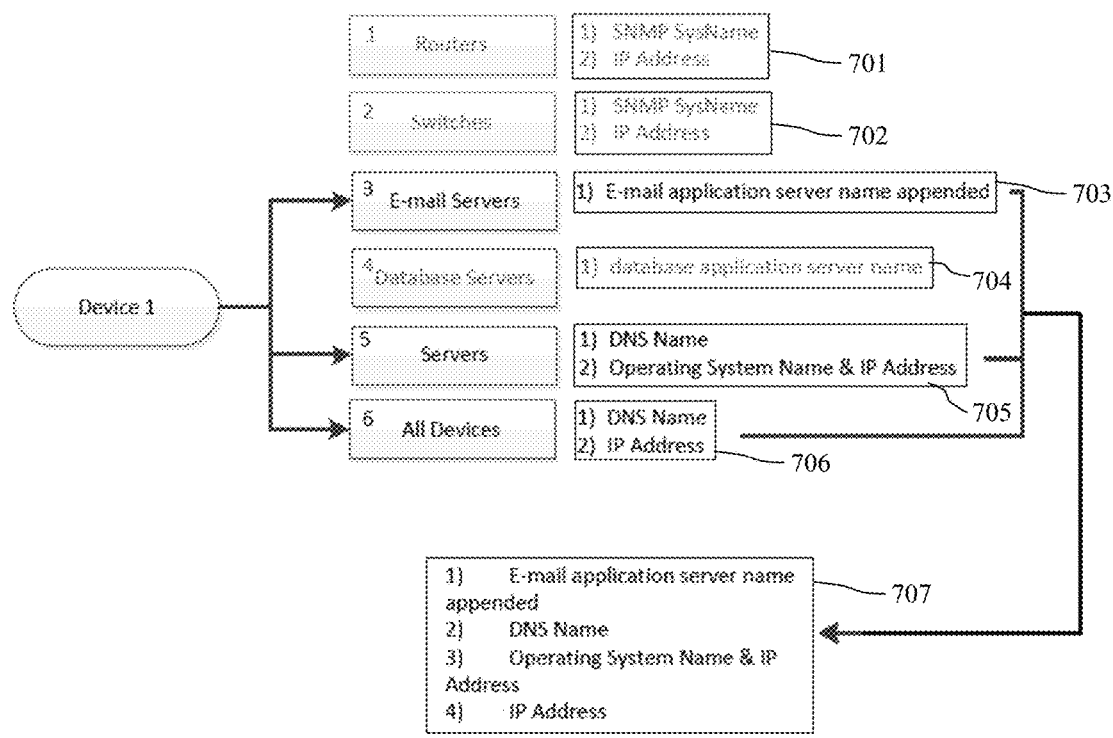
FIG. 6B depicts an example of assigning a consolidated item policy to a selected item that is associated with a plurality of groups.

FIG. 6B depicts an example of assigning a consolidated item policy to an item that is associated with a plurality of groups. Specifically, FIG. 6B continues from the example in FIG. 6A. In FIG. 6B, selecting device 104 selects an item, Device 1. Selecting device 104 then selects a policy type, the naming policy. Group determining device 105 may then determine a plurality of groups with which Device 1 is associated. The plurality of groups may comprise a combination of Groups 1-6, which are described above. In FIG. 6B, group determining device 104 determines that the item is associated with Groups 3, 5, and 6. Subsequently, policy determining device 106 may determine group policies for the naming policy that each corresponds to one of the plurality of groups. Specifically, for Group 3, policy determining device 106 identifies group policy 703; for group 5, policy determining device 106 identifies group policy 705; and for group 6, policy determining device 106 identifies group policy 706.

After the group policies have been determined, policy ranking device 107 may rank the group policies based on a predetermined priority. Ranking the group policies may comprise ranking the group policies based on a predetermined priority of the plurality of groups. In FIG. 6B, policy ranking device 107 may rank the group policies based on a priority of the plurality of groups. In the priority of the plurality of groups, Group 1 may have a first priority, Group 2 may have a second priority, Group 3 may have a third priority, Group 4 may have a fourth priority, Group 5 may have a fifth priority, and Group 6 may have a sixth priority. Thus, policy ranking device 107 may rank group policy 703 first, group policy 705 second, and group policy 706 third. Alternatively, in FIG. 6B, policy ranking device 107 may rank the group policies based on a different predetermined priority. In the different predetermined priority, group policy 703 may have a first priority, group policy 705 may have a second priority, group policy 706 may have a third priority, and all the other group policies may have a lower priority. Consequently, policy ranking device 107 may similarly rank group policy 703 first, group policy 705 second, and group policy 706 third.

After the group policies are ranked, policy generation device 108 may generate a consolidated item policy. The consolidated item policy may comprise the settings in group policies 703, 705, and 706 prioritized first based on the predetermined priorities corresponding to the group policies and second based on the ranking of group policies 703, 705, and 706. In FIG. 6B, policy generation device 108 may first select the group policy with the highest rank, group policy 703. Policy generation device 108 may determine the settings in group policy 703. Policy generation device 108 may then begin creating the consolidated item policy by adding the determined settings for group policy 703 to the consolidated item policy. After the determined settings for group policy 703 are added to the consolidated item policy, policy generation device 108 may determine that the selected item is associated with more groups, namely, Groups 5 and 6. Policy generation device 108 may repeat the above process for group policies 705 and 706 corresponding to Groups 5 and 6, respectively. Specifically, policy generation device 108 may select the group policy with the second highest rank, group policy 705, and add the settings for group policy 705 to the end of the consolidated item policy. Then, policy generation device 108 may select the group policy with the third highest rank, group policy 706, and add the settings for group policy 706 to the end of the consolidated item policy. Alternatively, as described above, policy generation device 108 may select all three of the group policies at the same time, determine each of their settings, and generate the consolidated item policy by organizing the determined settings based on the ranking of the group policies. Additional alternatives also exist.

In FIG. 6B, policy generation device 108 may remove matching settings. Prior to having the matching settings removed, the consolidated item policy may comprise "E-mail application server name appended" with a first priority, "DNS Name" with a second priority, "Operating System Name & IP Address" with a third priority, "DNS Name" with a fourth priority, and "IP Address" with a fifth priority. Policy generation device 108 may identify particular settings, namely, "E-mail application server name appended" with the first priority, "DNS Name" with the second priority, "Operating System Name & IP Address" with the third priority, and "IP Address" with the fifth priority. Policy generation device 108 may select a first particular setting, "E-mail application server name appended" with the first priority, and identify no additional settings in the consolidated item policy that match the first particular setting. Policy generation device 108 may then select a second particular setting, "DNS Name" with the second priority, and identify one additional setting in the consolidated item policy that matches the second particular setting, namely, "DNS Name" with the fourth priority. Policy generation device 108 may select "DNS Name" with the second priority and "DNS Name" with the fourth priority and determine which setting has a higher priority. In FIG. 6B, policy generation device 108 determines that "DNS Name" with the second priority has a higher priority and deletes or removes "DNS Name" with the fourth priority. Policy generation device 108 may then select a next particular setting and repeat the above process for the next particular setting. In FIG. 6B, policy generation device 108 removes the matching settings and generates a consolidated item policy 707. Consolidated item policy 707 comprises "E-mail application server name appended," "DNS Name," "Operating System Name & IP Address," and "IP Address," organized as such.

Alternatively, in FIG. 6B, policy generation device 108 may remove matching settings from the consolidated item policy as settings for the group policies are added to the consolidated item policy. Additional alternatives also exist. After policy generation device 108 generates the consolidated item policy for Device 1, assigning device 109 assigns the consolidated item policy to Device 1.

The flowcharts and diagrams in FIGS. 1-6B illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:
    selecting, using a selecting device, an item;
    determining a plurality of groups, the item associated with each of the plurality of groups,
    determining a plurality of group policies for a policy type, each of the plurality of group policies corresponding to one of the plurality of groups and comprising a setting;
    ranking the plurality of group policies based on a first predetermined priority;
    generating a consolidated item policy, the consolidated item policy comprising the settings in the plurality of group policies prioritized based on the ranking of the plurality of group policies; and
    assigning the consolidated item policy to the item.

2. The method of claim 1:
    wherein each of the plurality of group policies comprises a plurality of settings prioritized based on a second predetermined priority; and
    wherein the consolidated item policy comprises the pluralities of settings in the plurality of group policies prioritized first based on the second predetermined priority corresponding to each group and second based on the ranking of the plurality of group policies.

3. The method of claim 1, wherein an item comprises a computer component, a logical computer component, a physical network entity, and a logical network entity.

4. The method of claim 1, wherein a policy type is selected from the group comprising: a naming policy, a normalization policy, a collection rate policy, a display policy, a scheduling policy, an auditing policy, and a network management policy.

5. The method of claim 1, wherein a setting is selected from the group comprising: an internet protocol (IP) address, a system name, an application name, a server name, a domain name system (DNS) name, an operating system name, a source of information, a type of information, a collection rate for data, an order of reports, a method of displaying reports, a data retention rate, a number of allowed connected users, a computer networking port, a scheduled time, and an auditing process.

6. The method of claim 1, wherein ranking the plurality of group policies based on a first predetermined priority comprises ranking the plurality of group policies based on a predetermined priority of the plurality of groups.

7. The method of claim 1, further comprising:
    identifying one or more particular settings in the consolidated item policy;
    for each identified particular setting:
    identifying in the consolidated item policy one or more additional settings other than the identified particular setting that match the identified particular setting;
    determining among the identified particular setting and the identified one or more settings a setting that has a highest priority; and
    removing from the consolidated item policy the identified settings among the identified particular setting and the identified one or more settings that are not the setting that has the highest priority.

8. A system comprising:
    a selecting device configured to select an item;
    a first determining device configured to determine, in response to receiving the selection of the item, a plurality of groups that the item is associated with;
    a second determining device configured to determine a plurality of group policies for a policy type, each of the plurality of group policies corresponding to one of the plurality of groups and comprising a setting;
    a ranking device configured to rank the plurality of group policies based on a first predetermined priority;
    a generating device configured to generate a consolidated item policy, the consolidated item policy comprising the settings in the plurality of group policies prioritized based on the ranking of the plurality of group policies; and
    an assigning device configured to assign the consolidated item policy to the item.

9. The system according to claim 8:
    wherein each of the plurality of group policies comprises a plurality of settings prioritized based on a second predetermined priority; and
    wherein the consolidated item policy comprises the pluralities of settings in the plurality of group policies prioritized first based on the second predetermined priority corresponding to each group and second based on the ranking of the plurality of group policies.

10. The system according to claim 8, wherein an item comprises a computer component, a logical computer component, a physical network entity, and a logical network entity.

11. The system according to claim 8, wherein a policy type is selected from the group comprising: a naming policy, a normalization policy, a collection rate policy, a display policy, a scheduling policy, an auditing policy, and a network management policy.

12. The system according to claim 8, wherein a setting is selected from the group comprising: an internet protocol (IP) address, a system name, an application name, a server name, a domain name system (DNS) name, an operating system name, a source of information, a type of information, a collection rate for data, an order of reports, a method of displaying reports, a data retention rate, a number of allowed connected users, a computer networking port, a scheduled time, and an auditing process.

13. The system of claim 8, wherein the ranking device is configured to rank the plurality of group policies based on a first predetermined priority comprising a predetermined priority of the plurality of groups.

14. The system of claim 8, further comprising:
a first identifying device configured to identify in the consolidated item policy one or more particular settings;
for each identified particular setting:
a second identifying device configured to identify in the consolidated item policy one or more additional settings other than the identified particular setting that match the identified particular setting;
a determining device configured to determine among the identified particular setting and the identified one or more settings a setting that has a highest priority; and
a removing device configured to remove from the consolidated item policy the identified settings among the identified particular setting and the identified one or more settings that are not the setting that has the highest priority.

15. A computer program product comprising:
a non-transitory, computer readable storage medium having computer readable program code embodied therewith, the computer readable program code comprising:
computer readable program code configured to select an item;
computer readable program code configured to determine a plurality of groups, the item associated with each of the plurality of groups;
computer readable program code configured to determine a plurality of group policies for a policy type, each of the plurality of group policies corresponding to one of the plurality of groups and comprising a setting;
computer readable program code configured to rank the plurality of group policies based on a first predetermined priority;
computer readable program code configured to generate a consolidated item policy, the consolidated item policy comprising the settings in the plurality of group policies prioritized based on the ranking of the plurality of group policies; and
computer readable program code configured to assign the consolidated item policy to the item.

16. The computer program product according to claim 15:
wherein each of the plurality of group policies comprises a plurality of settings prioritized based on a second predetermined priority; and
wherein the consolidated item policy comprises the pluralities of settings in the plurality of group policies prioritized first based on the second predetermined priority corresponding to each group and second based on the ranking of the plurality of group policies.

17. The computer program product according to claim 15, wherein an item comprises a computer component, a logical computer component, a physical network entity, and a logical network entity.

18. The computer program product according to claim 15, wherein is selected from the group comprising: a naming policy, a normalization policy, a collection rate policy, a display policy, a scheduling policy, an auditing policy, and a network management policy.

19. The computer program product according to claim 15, wherein a setting is selected from the group comprising: an internet protocol (IP) address, a system name, an application name, a server name, a domain name system (DNS) name, an operating system name, a source of information, a type of information, a collection rate for data, an order of reports, a method of displaying reports, a data retention rate, a number of allowed connected users, a computer networking port, a scheduled time, and an auditing process.

20. The computer program product according to claim 15, wherein the computer readable program code configured to rank the plurality of group policies based on a first predetermined priority comprises computer readable program code configured to rank the plurality of group policies based on a predetermined priority of the plurality of groups.

21. The computer program product according to claim 15, further comprising:
computer readable program code configured to identify in the consolidated item policy one or more particular settings;
for each identified particular setting:
computer readable program code configured to identify in the consolidated item policy one or more additional settings other than the identified particular setting that match the identified particular setting;
computer readable program code configured to determine among the identified particular setting and the identified one or more settings a setting that has a highest priority; and
computer readable program code configured to remove from the consolidated item policy the identified settings among the identified particular setting and the identified one or more settings that are not the setting that has the highest priority.

* * * * *